(12) United States Patent (10) Patent No.: US 8,775,348 B2
Lebeau (45) Date of Patent: Jul. 8, 2014

(54) METHOD AND SYSTEM FOR AUTOMATIC ANALYSIS OF FAILURE OR STATE MESSAGES

(75) Inventor: Fabrice Lebeau, Boulogne (FR)

(73) Assignee: Dassault Aviation, Paris (FR)

( * ) Notice: Subject to any disclaimer, the term of this patent is extended or adjusted under 35 U.S.C. 154(b) by 385 days.

(21) Appl. No.: 13/243,872

(22) Filed: Sep. 23, 2011

(65) Prior Publication Data

US 2012/0078921 A1 Mar. 29, 2012

(30) Foreign Application Priority Data

Sep. 24, 2010 (FR) ...................................... 10 03793

(51) Int. Cl.
*G06F 17/00* (2006.01)
(52) U.S. Cl.
USPC .............................................. 706/46; 701/14
(58) Field of Classification Search
None
See application file for complete search history.

(56) References Cited

U.S. PATENT DOCUMENTS

| | | | |
|---|---|---|---|
| 6,208,955 B1 * | 3/2001 | Provan et al. | 703/20 |
| 6,567,729 B2 * | 5/2003 | Betters et al. | 701/31.5 |
| 6,751,536 B1 * | 6/2004 | Kipersztok et al. | 701/31.6 |
| 6,901,318 B1 * | 5/2005 | Morronigiello et al. | 701/29.4 |
| 7,065,433 B2 * | 6/2006 | Basu et al. | 701/31.9 |
| 2003/0115020 A1 * | 6/2003 | Adachi et al. | 702/184 |
| 2003/0167111 A1 | 9/2003 | Kipersztok et al. | |
| 2009/0099790 A1 * | 4/2009 | Pado | 702/35 |
| 2012/0011403 A1 * | 1/2012 | Bock et al. | 714/30 |
| 2012/0041575 A1 * | 2/2012 | Maeda et al. | 700/80 |

FOREIGN PATENT DOCUMENTS

| | | |
|---|---|---|
| GB | 2452025 A | 2/2009 |
| WO | 02-086750 A1 | 10/2002 |
| WO | 2007-093756 A1 | 8/2007 |

OTHER PUBLICATIONS

Gardner, R D et al.: "Methods and systems for alarm correlation", Global Telecommunications Conference, 1996. Globecom '96. Communications: The Key to Global Prosperity London, UK Nov. 18-22, 1996, New York, NY, USA, IEEE, US, vol. 1, Nov. 18, 1996, pp. 136-140, XP010220339, DOI: DOI:10.1109/GLOCOM. 1996. 594348 ISBN: 978-0-7803-3336-9.

Jacques-H Bellec et al.: "Behavioural Proximity Approach for Alarm Correlation in Telecommunication Networks", Jan. 1, 2006, MICAI 2006: Advances in Artificial Intelligence Lecture Notes in Computer Science; Lecture Notes in Artificial Intelligence; LNCS; Springer, Berlin, DE, pp. 674-683, XP019051144, ISBN: 978-3-540-49026-5.

Search Report issued on Jan. 20, 2011 for French Application No. 1003793—4 pages.

* cited by examiner

*Primary Examiner* — Jeffrey A Gaffin
*Assistant Examiner* — David H Kim
(74) *Attorney, Agent, or Firm* — Knobbe, Martens, Olson & Bear, LLP (57) ABSTRACT

This method for automatic analysis of failure or state messages generated by at least one complex system is characterized in that it comprises the steps for integrating said messages to a database of failure or state messages, and for determining with a computer, for each of said messages, an index of overall interest characterizing a degree of relevance of said message, on the basis of at least one parameter representative of a frequency of occurrence of similar messages in said database, and a correlation between said or each representative parameter and a predefined number of indexes of overall interest. A corresponding analysis system is also provided.

17 Claims, 4 Drawing Sheets

METHOD AND SYSTEM FOR AUTOMATIC ANALYSIS OF FAILURE OR STATE MESSAGES

CROSS-REFERENCE TO RELATED APPLICATIONS

This application claims the benefit of French Application No. 10 03793 filed Sep. 24, 2010 which is hereby expressly incorporated by reference in its entirety.

BACKGROUND OF THE INVENTION

1. Field of the Invention

The present invention relates to a method for automatic analysis of failure or state messages generated by at least one complex system.

In particular, it relates to the analysis of failure and state messages generated by complex systems such as aircraft or automobiles. In the following description, only the case of aircraft is mentioned as an example, the described method and system being transposable to other types of vehicles.

2. Description of the Related Art

In the field of aeronautics, notably, maintenance of aircraft is of paramount importance for ensuring their reliability and minimizing the risk of accidents. This maintenance has several aspects. The aircraft are notably subject to regular, planned inspections, so as to ensure the absence of any malfunction. Moreover, inspections and repairs are also carried out when failures occur. On aircraft with a modern design, when one or more malfunctions occur during flight, these malfunctions are recorded by a system on board the aircraft in the form of failure or state messages. These messages are then analyzed on the ground by technicians with the purpose of determining the hardware problems, i.e. the components of the aircraft at the origin of the observed malfunctions and of repairing these components.

In order to facilitate these analyses, it is known how to resort to expert systems dedicated to the resolution of failures, which automatically infer from databases made up from solved failure cases and/or from theoretical failure cases stemming from fault tree modeling, which components and which failures may be at the origin of the recorded messages. Such a system is notably described in document US 2003/0167111 A1.

However, these expert systems are based on written reports on searches for failures and on formal fault trees, which do not always report the whole of the process for searching for failures and which may be inaccurate notably because of human errors and inhomogeneities in the writing of the reports and of the trees. Further, for complex apparatuses, the number of existing different failure or state messages, of the order of several thousands, makes the setting up of complete and reliable databases extremely complex, long and costly.

Moreover, such systems do not give the possibility of automatically distinguishing with self-learning, among the recorded messages, the messages which do not require analysis from the messages requiring extensive analysis, and for the latter such systems neither give the possibility of distinguishing the messages corresponding to known and documented failures or states from the non-documented messages.

Now, each use of a complex system such as an aircraft generates a large number of messages, often more than one thousand, and the absence of efficient and native filtering of these messages in the central maintenance computer slows down the diagnostic by the operator.

SUMMARY OF THE INVENTION

The object of the invention is therefore to solve the problems mentioned above and to propose an automatic analysis method with which the interpretation and exploitation of the messages may be facilitated and improved.

For this purpose, the object of the invention is a method of the aforementioned type, characterized in that it comprises the following steps:

integration of said messages to a database of failure or state messages, determination by a computer for each of said messages, of an index of overall interest characterizing a degree of relevance of said message, on the basis of at least one representative parameter of a frequency of occurrence of similar messages in said database, and of correlation between said or each representative parameter and a predefined number of indexes of overall interest.

According to particular embodiments, the analysis method includes one or more of the following features, taken individually or according to all the technically possible combinations:

the analysis method further comprises a step for determining, for each of said messages, a index of local interest, characterizing a degree of interest of said messages, depending on said index of overall interest and on a local context for occurrence of this message;

the analysis method further comprises a step for displaying at least one portion of said messages and of the indexes of local interest determined for these messages;

the analysis method further comprises a step for determining said local context of occurrence of each failure or state message, comprising the determination of the duration of occurrence of this message and identification of other messages generated by said complex system and related to the same malfunction as said message;

the analysis method further comprises a step for associating with each failure or state message, an attribute, indicating the existence or the absence in at least one database of technical reports, of information relating to said message;

the step for determining the index of overall interest of a message comprises a step for determining a frequency of occurrence of similar messages in said database, relatively to the total number of generated messages in a same overall context;

the step for determining the index of overall interest of a message comprises a step for determining a proportion of complex systems for which similar messages have been generated, relatively to the total number of complex systems for which failure or state messages have been generated in a same overall context;

said correlation between said or each representative parameter and a predefined number of indexes of overall interest is carried out by means of an assignment table indicating the value of the index of overall interest of said message depending on the value of the representative parameter(s);

the analysis method comprises a step for assigning to a configuration of said complex system a label characterizing a degree of stability of said database upon integrating said failure or state messages to said database;

the step for assigning a label comprises the determination of a convergence index, characterizing to which extent the integration of said messages to said database modifies the distribution of the types of messages and of complex systems in said database;

the determination, for each of said messages, of an index of overall interest is further carried out on the basis of the label assigned to the configuration of said complex system;

the index of overall interest of each failure or state message is determined from at least three values.

said complex system is an aircraft.

The object of the invention is also a system for automatic analysis of failure or state messages generated by at least one complex system, characterized in that it comprises:

means for integrating said messages to a database of failure or state messages, and means for determining, for each of said messages, an index of overall interest, characterizing the frequency of recurrence of similar messages in said database.

According to a particular embodiment, the analysis system comprises means for determining, for each of said messages, an index of local interest, reflecting a level of interest of said messages, depending on said index of overall interest and on a local context of occurrence of these messages.

BRIEF DESCRIPTION OF THE DRAWINGS

The invention will be better understood upon reading the following, only given as an example, and made with reference to the appended drawings, wherein.

DETAILED DESCRIPTION OF THE PREFERRED EMBODIMENT

Figure 1:
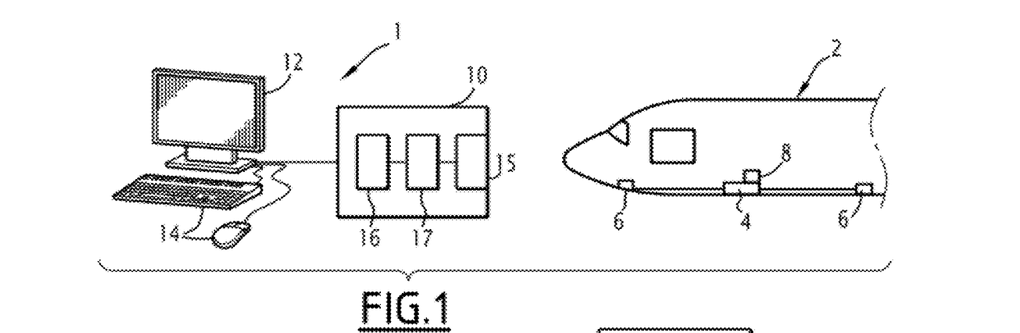
FIG. 1 is a diagram illustrating an analysis system according to an embodiment of the invention.

An analysis system 1 adapted to the application of the method according to the invention is illustrated in FIG. 1 schematically for analyzing messages recorded during the flight of an aircraft 2.

The aircraft 2 comprises at least one central maintenance computer 4 also called a CMC (Centralized Maintenance Computer), connected to several pieces of equipment 6 distributed in the aircraft 2 through a digital bus as well as optionally to a system 8 of coded communications.

The pieces of equipment 6 of the aircraft 2 are capable of self-testing on their own initiative or in response to a request from the central computer 4, and of generating failure or state labels transformed into failure or state messages by the central computer 4.

Moreover the central computer 4 is capable of storing these messages and of generating the display thereof notably in the cockpit.

The system 8 of coded communications, when it is installed is capable of transmitting securely to the analysis system 1, in flight or on the ground, automatically or upon a manual control, the whole of the failure and state messages generated and stored by the central maintenance computer 4.

The analysis system 1 comprises a computer 10 and user interfaces, notably a display device 12 and input peripherals 14.

The computer 10 notably comprises interface means 15 capable of receiving data transmitted by the coded communications system 8, a processor 16 and a memory 17, i.e. a data storage space in which is stored a database of failure or state messages collected on various aircraft and during various flights of these aircraft and subsequently called a central database.

Figure 2:
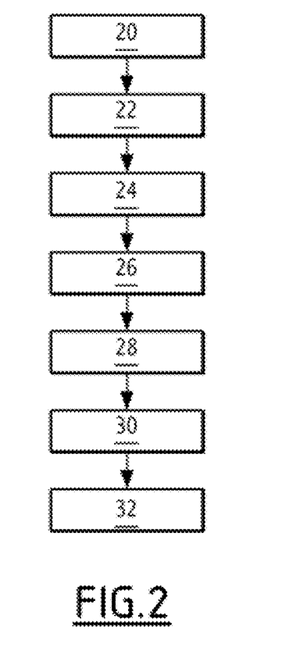
FIG. 2 is an overall block diagram illustrating the application of an analysis method according to one embodiment of the invention.

The main steps of the analysis method according to the invention, applied after a flight of the aircraft 2 are illustrated in FIG. 2.

This method comprises an import step 20, during which the messages collected by the central maintenance computer 4 during the flight of the aircraft 2 are transmitted from the maintenance computer 4 to the analysis system 1, optionally via the communications system 8, in the form of one or several computer files.

Next, during a step 22 for integrating the data, the messages contained in each imported file during step 20 are integrated, after being formatted, to the central database of the computer 10. These messages form a set subsequently called a new sample or new data.

In a step 24 for statistical analysis, the controller 10 analyzes the contents of the central database in order to determine whether this database is of a statistically significant size. The controller 10 notably determines whether the new integration data during step 22 are associated with a new aircraft configuration, i.e. with a craft model or a software version absent from the database before this integration 22.

In the opposite case, the controller 10 determines whether the database already comprised before this import, a significant number of messages from aircraft with the same configuration, forming a set subsequently called a sample, so that this integration 22 does not modify in a statistically significant way the distribution of the classes of messages of this sample.

This step 24 is followed by a step 26 for determining indexes of overall interest $I_G$, during which the computer 10 classifies the messages of the sample per classes of messages, i.e. groups the messages meeting at least the following criteria:

they correspond to the same failure or to the same state, they were reported on craft of similar configurations (for example of the same models, same software versions).

During this step 26, the computer 10 determines for each class of messages present in the new data, the frequency of occurrence of this class of messages in the sample and the proportion of craft on which this class of messages has appeared. The computer 10 infers therefrom, for each class of messages, an index of overall interest $I_G$, which expresses the level of interest and relevance of this class of messages.

This overall interest index is common to all the occurrences of the messages of the same class. The index of overall interest $I_G$ may assume several values, advantageously 3. The index of overall interest $I_G$ of a message expresses whether this message globally reflects an isolated or not very frequent problem ($I_G=1$), or moderately frequent problem ($I_G=2$), or a very frequent message ($I_G=3$). The messages with an index of interest of 1 and 2 require analysis by the operator, beginning by the analysis of the messages with an index of interest $I_G=1$, unlike the messages of an index of overall interest of 3 which may be filtered and which do not require any analysis. Thus, the messages are of an all the larger significance since their index of overall interest $I_G$ is low.

This filtering may, during a step 28, be further refined: the computer 10 determines, for each of the message recordings of the new sample, a index of local interest $I_L$, characterizing a degree of interest of the message. If the option of this is selected by the user, this index of local interest $I_L$ is determined for each recording from the index of overall interest $I_G$ of the class of this message and depending on its local context of occurrence, notably defined by its duration of occurrence and the joint presence in time of other characteristic failure or state messages. These characteristic messages are detected from a list of messages assigned for each message class, manually inputted by the user. By default, the list is empty for each class. If this option of the calculation of the index of local interest $I_L$ is not selected, the index of local interest $I_L$ assumes for each message occurrence, the value of the index of overall interest of the class of this message.

The index of local interest $I_L$ may assume several values advantageously as many as there are values of an index of overall interest $I_G$. Just like for the index of overall interest, the messages are of a significance all the larger since their index of local interest $I_L$ is low.

During a step 30, the computer associates with each failure or state message an attribute, indicating whether this failure is documented or not, i.e. the existence or the absence in one or more databases (advantageously: failure reports, sales of spares parts, survey reports, guarantee claim), of documents relating to identical or similar failures or states, for example failures or states involving the same piece of equipment of the aircraft 2.

Thus, at the end of step 30, each failure or state message is associated with a index of local interest $I_L$ and with an attribute relating to the existence of documentation on this failure.

These messages are then displayed in a step 32 by the system 1, for example on the display device 12, according to display parameters defined by the user, and allowing the latter to filter out the displayed messages, for example by selecting a given class of messages or the messages for which the index of local interest $I_L$ has a selected value. Thus, the user may choose to only display the messages requiring analysis.

The steps 20 to 32 of the method according to a particular embodiment of the invention will now be described in more details, with reference to FIGS. 3-8.

During the import step 20, the messages are transmitted from the maintenance computer 4 to the analysis system 1, advantageously via the communications system 8 in the form of one or more computer files, which are for example files of the <<FHDB>> (Fault History Database) type, files of the <<ACMF>> (Aircraft Customized Monitoring File) type or files of the <<Data broadcast>> type.

It will be considered subsequently and for the example, that the central computer 4 of the aircraft 2 transmits a single file of the <<FHDB>> type to the analysis system 1, the logic being identical for the two other types of files.

The data, i.e. the failure and state messages recorded in this file are for example saved as tables or in the XML format.

With this file are associated in step 22 the model of the aircraft 2 from which it stems, the serial number of the aircraft and the version of its operating software. This file comprises a list of failure or state messages, each of the messages having the following characteristics:

a literal specifying the type of observed failure or state,
a code associated with this literal (for example: a failure code or message criticality),
a status: <<active>> for marking that the recording of the message corresponds to its occurrence, i.e. to its logic validity, and <<inactive>> for its disappearance.
the date and time of occurrence/disappearance of this message,
the occurrence phase (for example the pre-flight phase, the taxiing phase, taking-off phase, ascension phase, cruising phase, descent phase or landing phase).

In step 22 a delivery attribute is added, assuming the value 1 if the recording of the message is earlier than the delivery date of the serial number, or 0 if required. The information on the delivery dates is for example extracted from another database. The goal of this attribute is to be able to distinguish the assignment of an overall and local interest index in the phases for receiving and testing the aircraft, during which certain failures are intentionally caused, of the in-service phase during which the failures are not generally caused.

Finally in step 22 is added a <<Latch>> (or lock) attribute, moreover advantageously marked natively in the failure literal with the symbol "#". In addition to its first recording, corresponding to its logic validity, a latched message (i.e. locked) by the maintenance computer 4 is rerecorded in the FHDB file with the <<active>> status at each starting of the maintenance computer. Such a message is only recorded with the <<inactive>> status if its logic is no longer valid and if a manual suppression action is performed on the maintenance computer by an operator, by means of a specific interface. The attribute <<Latch>> therefore indicates whether the message is a message which occurs as long as it has not been suppressed.

Each failure or state message M may thus be advantageously written as:

$$M=(Model, Software, Serial\ Number, Failure\ Literal, Failure\ code, Date, Status, Phase, Latch, Delivery).$$

Moreover it is considered that two messages have the same overall context CO of occurrence if they have certain common features from the features defined above. These common features may be selected by a user. Advantageously, the model of the aircraft, its operating software version, the flight phase during which the failure occurred, the delivery attribute and the status of the message define this overall context CO of occurrence of the message.

Moreover, it will be considered that two messages are of a same class if they have the same overall context CO of occurrence and if they have at least one additional common feature. The common features which two messages should have in order to be considered of the same class may also be selected by a user.

Advantageously, the overall context CO of a message, the failure literal and its code define the class T of this message. In the following description, it will thus be considered that two failure or state messages are of the same class if they correspond to the same literal and failure code, have been reported on two craft of the same model and with the same operating software version, during the same flight phase and whether these messages have the same delivery attribute and the same status. A class of messages is therefore defined by the following set T, common to all the messages of the same class:

T=(Model,Software,Failure literal,Failure code,Phase, Delivery,Status).

During the import step 20, the imported files are received by the computer 10 which checks whether these are actually files containing failure or state messages, by analyzing the format of these files and their literal.

Next, during the integration step 22, the computer 10 opens the file and records its contents in a dump table, which is a temporary storage location of these data. The attributes, Mode, Serial number, Software configuration are then added from the literal of the <<FHDB>> file and the attribute <<Delivery>> from a database of deliveries and of the date of each recording. <<Marker>> messages may be added if need be. They are not native from the generation of messages by the maintenance computer 4: these are for example power-on state messages or state messages for deleting latched messages. At the end of step 22, the messages contained in each file imported during step 20 and these new attributes are integrated, while automatically suppressing duplicates, to the database of the computer 10.

Advantageously, the data then appear as a table, each of the lines of which corresponds to a failure or state message recording and each column to a feature of this message.

Figure 3:
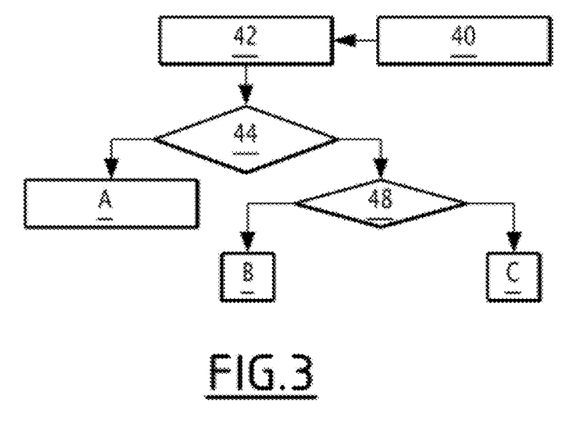
FIG. 3 is a block diagram representing a step for statistical analysis of failure or state messages of the method of FIG. 2, according to a particular embodiment of the invention.

A block diagram illustrating the step 24 for statistical analysis of the new sample is illustrated in FIG. 3.

After several imports performed according to step 20, the database of the computer 10 comprises messages stemming from apparatuses of different models, of different serial numbers and of different operating software packages.

In a step 40 of this statistical analysis step 24, the user defines the properties of an aircraft configuration CF, advantageously defined by CF=(Model, Software, Delivery).

The computer 10 carries out in 42 the detection of the CF configurations and the calculation of the number of aircraft serial numbers 2 in each configuration, before and after import 20 of the new sample.

Next, during a step 44, the computer determines whether the new integrated data during step 22 stem from an aircraft configuration not represented in the database before step 20. If the newly imported configuration was absent from the database, the computer assigns a label A to this configuration.

If, on the contrary the database comprised, before step 20, messages stemming from craft of the same configuration, then in a step 48, the computer 10 assigns a label B to the configuration if the latter is still fluctuating and a label C if on the contrary the size of the sample in this configuration is such that any import of new files does not significantly modify the distribution of the types of failure or state and of craft of this configuration: it is said to be stable.

The assignment of the labels B and C is carried out from the determination of convergence indexes and from the number of serial numbers in the database for each configuration CF. The determination of these conversion indexes will be detailed subsequently in the description. If the convergence indexes are greater than a certain threshold, for example 5%, or if the number of aircraft serial numbers 2 in the given configuration is less than a certain threshold, for example 7, then the label B is assigned to this configuration. In the opposite case, the label C is assigned.

Each configuration CF thus has in the database of the computer 10 a label, the purpose of which is to calculate the index of overall interest $I_G$ of each message class distinctly according to the contents and the size of the sample for each configuration and to thereby improve the accuracy thereof.

Figure 4:
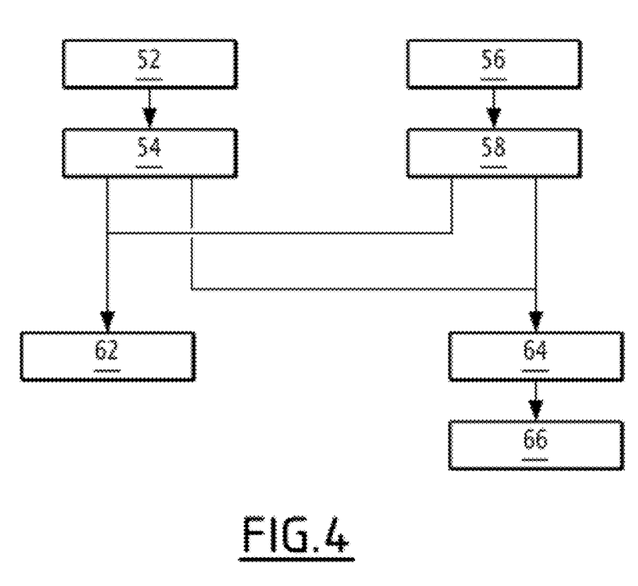
FIG. 4 is a block diagram illustrating a step for determining an index of overall interest for each reported class of failures, according to a particular embodiment of the invention.

A block diagram illustrating the step 26 for determining the overall interest of each message class T is illustrated in FIG. 4.

In a step 52, the computer 10 determines, for each message class represented in the new sample, a frequency ratio $r_{fq}$ of occurrence of this class of messages, representative of the frequency of occurrence of similar messages in the database with respect to the whole of the recorded messages.

In the case of non <<latched>> messages, this frequency ratio is equal to the ratio between the number of occurrences of this class of messages and the number of recorded messages with the same overall context in the database. In the case of so-called <<latched>> messages, it is equal to the ratio between the number of occurrences of this class of messages and advantageously 10 times the number of recorded messages with the same overall context in the database. This computation rule allows the multiplying effect of the <<latch>> logic to be considered on the recordings of latch messages, as long as no manual action from the operator has been carried out in the maintenance computer.

The frequency ratio $r_{fq}$, comprised between 0 and 1, thus expresses the frequency of occurrence of this class of messages in a given overall context CO, with respect to the other classes of messages appearing in the same overall context CO.

For example, if the database comprises 6 occurrences of a message of class $T_1$, having occurred in an overall context $CO_1$, and 60,000 occurrences of messages having occurred in the same overall $CO_1$, i.e. on the same aircraft model, with the same operating software version, during the same flight phase and with the same status and delivery attribute, the frequency ratio of the messages of class $T_1$ is equal to $10^{-5}$.

Next, in a step 54, the calculator assigns to each class of messages, from the values of computed frequency ratios $r_{fq}$, an index of frequency interest $I_{rfq}$. This index of frequency interest $I_{rfq}$ characterizes the value of the frequency ratio $r_{fq}$ of this class of messages relatively to the values of frequency ratios of the other classes of messages of the sample having occurred in the same overall context.

This index is for example an integer, comprised between 1 and $N_{rfq}$, with $N_{rfq}$ advantageously less than or equal to 6, the index of frequency interest $I_{rfq}$ of a class of messages of a given overall context being all the higher since its frequency ratio $r_{fq}$ is large.

Advantageously, the index of frequency interest $I_{rfq}$ is assigned, for the classes of messages of a given overall context CO, by cutting out the interval [0;1] of possible values of the frequency ratio $r_{fq}$ into $N_{rfq}$ successive intervals ($In_1$, $In_2$, ... $In_{Nrfq}$), forming a partition of the interval [0;1]. For this purpose, the computer 10 determines $N_{rfq}-1$ threshold values noted as $S_i$ with $1 \le i < N_{rfq}$, delimiting the intervals ($In_1$, $In_2$, ... $In_{Nrfq}$), and such that the probabilities for the frequency ratio $r_{fq}$ of a message of a given class to be comprised in any of these intervals are substantially equal. Further, to each interval $In_i$ is assigned a value of a frequency interest $I_{rfq}$, equal to the index I of this interval.

Thus, all the classes of messages of overall context CO, the value of the frequency ratio $r_{fq}$ of which is comprised in the interval $L_{n1}$, have the value i for the index of frequency interest $I_{rfq}$.

When a label C was assigned to the configuration during the statistical analysis step 24, the index of frequency interest $I_{rfq}$ is advantageously comprised between 1 and 6.

When the label of the configuration is A or B, the index of frequency interest $I_{rfq}$ is advantageously comprised between 1 and 2, since the number of different values assumed by the frequency ratio $r_{fq}$ is then too small for a cutting out of the interval [0;1] into a larger number of intervals having any sense or being possible.

Moreover, in a step 56, the computer 10 determines, for each class of messages, a cover ratio $r_c$ equal to the ratio between the number of aircraft of the sample for which a message of this class has been transmitted, and the number of aircraft of the sample for which a failure or state message has been transmitted in the same overall context CO.

The cover ratio $r_c$ of a class of messages, comprised between 0 and 1, thus expresses the proportion of aircraft for which this class of messages has been transmitted, with respect to the set of aircraft for which a failure or state message has been transmitted in the same overall context. It is therefore representative of the frequency of occurrence of similar messages for aircraft of the same configuration, and allows an estimation whether the messages of class $T_1$ are isolated messages observed on not very many aircraft, or whether on the contrary this class of messages is transmitted by a significant proportion of aircraft.

For example, if at least one message of class $T_1$ has been transmitted for 6 aircraft, and that failure or state messages have been reported in the same overall context on 36 aircraft, the cover ratio of the messages of class $T_1$ is equal to ⅙.

Next, in a step 58, the computer 10 assigns to each class of messages from the determined cover ratio $r_c$ values, a cover interest index $I_{rc}$, characterizing the value of the cover ratio of this class of messages with respect to the cover ratios of the other classes of messages of the sample having appeared in the same overall context.

This index is for example an integer, comprised between 1 and $N_{rc}$, with $N_{rc}$ advantageously less than or equal to 3, the cover interest index $I_{rc}$ of a class of messages of a given overall context CO being all the higher since its frequency ratio $r_c$ is large.

The cover interest index $I_{rc}$ is assigned by cutting out the interval [0;1] of the possible values of the cover ratio $r_c$ into $N_{rc}$ successive intervals $In'_k$, with $1 \leq k \leq N_{rc}$, forming a partition of the interval [0;1]. For this purpose the computer 10 determines $N_{rc}-1$ threshold values, noted as $S'_k$, with $1 \leq k < N_{rc}$, delimiting the intervals $In'_k$. To each interval $In'_k$ is assigned a value of a cover interest index $I_{rc}$, equal to the index k of this interval, so that all the classes of messages of overall context CO for which the value of the cover ratio $r_c$ is comprised in the interval $In'_k$ of index k has the value k for the cover interest index $L_{rc}$.

Advantageously, $N_{rc}=3$, and the threshold values are determined so that the index of interest $I_{rc}=1$ is assigned to the classes of messages reported on at least 20% of the aircraft having recorded a failure or state message within the same overall context, that the index of interest $I_{rc}=2$ is assigned to the classes of messages reported on more than 20% but less than 40% of these aircraft, and the index of interest $I_{rc}=3$ is assigned to the classes of messages reported on more than 40% of these aircraft.

Next, in a step 62, the computer 10 assigns to each class of messages represented in the new sample, an index of overall interest $I_G$, depending on the values of the frequency interest $I_{rfq}$ and cover $I_{rc}$ indexes of this class of messages, and on the label A, B or C assigned to the corresponding configuration during the statistical analysis step 24.

Advantageously, this index of overall interest is an integer which may assume 3 values, for example the values 1, 2 and 3.

As a general rule, the index 1 is assigned to the classes of messages with low frequency interest indexes $I_{rfq}$ and low cover indexes $I_{rc}$, i.e. to messages which are not very frequent and are observed on not many aircraft, the index 2 is assigned to the classes of messages for which the frequency $I_{rfq}$ or cover $I_{rc}$ interest indexes are intermediate values, and the index 3 to the classes of messages for which the frequency $I_{rfq}$ or cover $I_{rc}$ interest indexes are high, i.e. to the classes of frequent and reported messages on a significant proportion of aircraft.

These indexes of overall interest $I_G$ are determined from assignment rules which may be selected by a user and which are advantageously specific to each aircraft model.

Table 1 below thus illustrates an example of the rules for assigning the index of overall interest $I_G$ to classes of messages represented in newly imported data, depending on the values of the frequency $I_{rfq}$ and cover $I_{rc}$ interest indexes of these messages, in a label configuration A or B.

TABLE 1

|  | $I_{rc}$ | |
| --- | --- | --- |
| $I_{rfq}$ | 1 | 2 |
| 1 | 1 | 2 |
| 2 | 2 | 3 |

Thus, the index of overall interest $I_G$ of a class of messages is only equal to 1 when its frequency $I_{rfq}$ and cover $I_{rc}$ interest indexes are both equal to 1, and is equal to 3 when its frequency $I_{rfq}$ and cover $I_{rc}$ interest indexes are both equal to 2.

Table 2 below moreover illustrates an example of rules for assigning an index of overall interest $I_G$ to classes of messages represented in newly imported data, depending on the values of the frequency $I_{rfq}$ and cover $I_{rc}$ interest indexes of these messages, in a label configuration C.

TABLE 2

|  | $I_{rc}$ | | |
| --- | --- | --- | --- |
| $I_{rfq}$ | 1 | 2 | 3 |
| 1 | 1 | 1 | 2 |
| 2 | 1 | 2 | 2 |
| 3 | 1 | 2 | 2 |
| 4 | 1 | 2 | 2 |
| 5 | 2 | 2 | 2 |
| 6 | 2 | 2 | 3 |

Thus, the index of overall interest $I_G$ of a class of messages is only equal to 3 when its frequency $I_{rfq}$ and cover $I_{rc}$ interest indexes are both at a maximum, i.e. equal to 6 and 3, respectively.

At the same time, the computer 10 determines the convergence index of the database, measuring the stability of this database upon adding new data to this base, convergence indexes which will be used a posteriori, during the statistical analysis of a new subsequently integrated sample, in order to assign a label B or C to the configuration.

For this purpose, the computer 10 determines in a step 64 the averages $M_{fq}$ and $M_c$ of the variations of the frequency $r_{fq}$ and cover $r_c$ ratios, with respect to the determined ratio values during the analysis of the messages of the database after the previous import.

Next, in a step 66, the computer 10 determines the sliding averages of the variations $M_{fq}$ and $M_c$ calculated over the ten preceding average imports which are the convergence indexes mentioned previously. These convergence indexes quantify whether the addition of new messages to the sample modifies the frequency $r_{fq}$ and cover $r_c$ ratios assigned to the different classes of messages of this sample, therefore the stability of this sample. At the end of step 66, the computer stores these indexes in memory, which will be used during the next import and compared with the 5% threshold value.

In the case of a change of label, from B to C or from C to B and taking into account the different overall interest assignment rules between label B and label C, the calculation of the convergence indexes is carried out but the label is frozen, for example during the next ten imports. Subsequently, the convergence indexes are again taken into account for assigning a label. This label approach is carried out independently for each configuration CF present in the central database.

Figure 5:
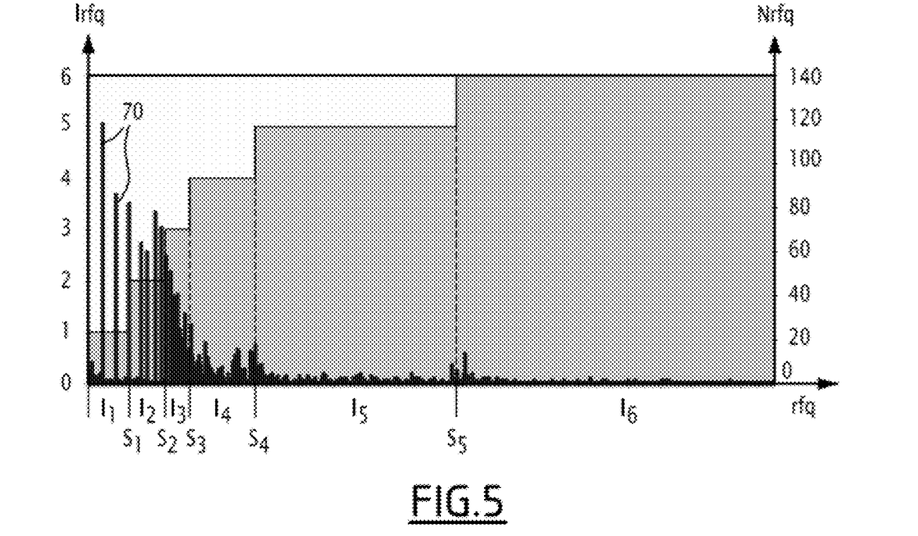
FIG. 5 is a graph representing the step for determining an index of overall interest of FIG. 4.

FIG. 5 illustrates the step 54 for determining the frequency interest of classes of messages. This FIG. 5 is a graph notably illustrating the distribution of the frequency ratio values $r_{fq}$ of a plurality of classes of messages of the same overall context CO. The number $N_{rfq}$ of messages having a given frequency ratio $r_{fq}$ (right ordinate) is thus illustrated in this graph, versus the frequency ratio value $r_{fq}$ (abscissa). This graph appears as a set of bars 70 with a given frequency ratio $r_{fq}$. Each of these bars 70 generally corresponds to the whole of the messages of a same class.

Moreover a histogram of the values of the frequency interest indexes $I_{rfq}$ (left ordinate) versus the frequency ratio value $r_{fq}$ (abscissa x) is superposed to this figure. This histogram defines 6 successive intervals $I_1$ to $I_6$ of frequency ratio values $r_{fq}$, the limits of which are notably defined by 5 threshold values $S_1$ to $S_5$. Each of the intervals $I_1$ to $I_6$ includes a quasi-equal number of failure or state messages so that the probabilities for any message belonging to each interval are quasi-equal. With each interval is associated a frequency interest index $I_{rfq}$, assuming the values 1, 2, 3, 4, 5 and 6 over the respective intervals $I_1$, $I_2$, $I_3$, $I_4$, $I_5$ and $I_6$.

At the end of step 26, an index of overall interest $I_G$ is associated with each class of messages, therefore with each message, represented in the new sample, i.e. reported on the aircraft 2. This index of overall interest $I_g$ expresses the frequency of occurrence of the messages of the same class within a same overall context CO. However it does not take into account any local context for the occurrence of each of these messages, and in particular the duration of occurrence of these messages and the presence of other characteristic messages reported on the aircraft 2.

Figure 6:
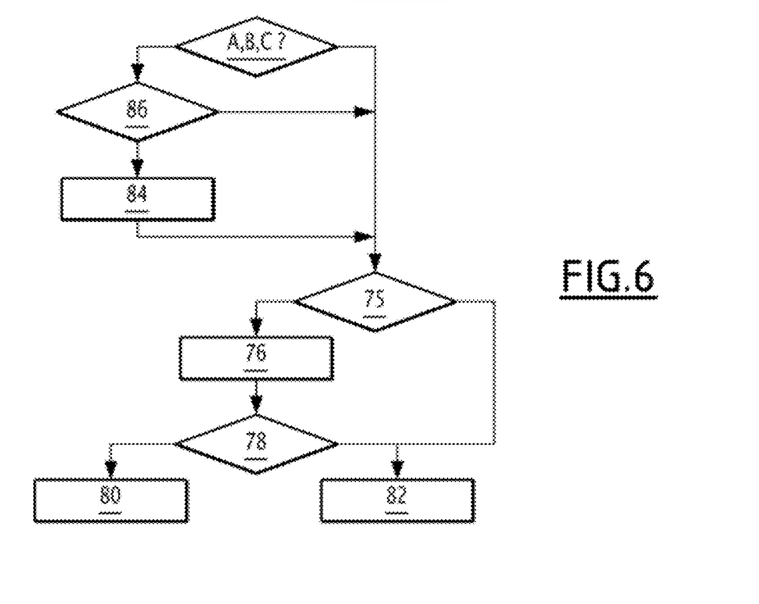
FIG. 6 is a block diagram illustrating a step for determining an index of local interest for each reported failure, according to a particular embodiment of the invention.

If this option is selected, the local context is taken into account during step 28 for determining, for each recording of the new sample, a index of local interest $I_L$. This step 28 is illustrated in FIG. 6.

The rules for determining the indexes of local interest $I_L$ of each failure message differ according to the label A, B or C assigned to each configuration CF of the sample.

If the configuration of the sample has a label B or C, the index of local interest $I_L$ of each message is determined according to its index of overall interest $I_G$, and to criteria selected by the user. These criteria are for example the duration of occurrence of the message, the neighboring presence of other characteristic messages manually listed by the operator, or further the average rate per aircraft of the occurrence of messages of the same class in the sample.

The analysis of this average occurrence rate allows the messages to be significantly distinguished (of the order of 3 times), more or less present on aircraft 2 than on aircraft with the same configuration.

The taking into account of the duration of occurrence of the message moreover allows messages to be located, for which the occurrence duration on the aircraft 2 is significantly (of the order of 3 times) larger or lower than the average duration of occurrence of messages of the same class in the sample.

Further, the taking into account of the presence of other characteristic messages allows the messages to be distinguished which have appeared together with one or more other messages listed by the user.

Thus, if this option is activated during a step 75, the computer 10 determines during a step 76 for each message these pieces of local context information. From these pieces of information and if the option is activated, the computer 10 determines, during a step 78 whether this message meets at least one of the criteria defined above.

If such is the case, and if the index of overall interest $I_G$ of the analyzed message is greater than the minimum index, i.e. 1, the computer 10 assigns to this message, in a step 80, a index of local interest $I_L$ equal to the index of overall interest $I_G$ reduced by 1, so as to enhance the relevance of this message. If the index of overall interest $I_G$ is equal to 1, the computer 10 assigns to this message a index of local interest $I_L$ equal to the index of overall interest $I_G$, i.e. equal to 1. If on the contrary the criteria are not met, the computer assigns in a step 82 an index of local interest $I_L$ equal to the index of overall interest $I_G$.

If the option for taking into account the local context information is not activated during step 75, the index of local interest $I_L$ of each recording is equal to the index of overall interest of the corresponding class of messages (step 82).

If on the contrary, the configuration has a label A and thus exclusively contains the new data, the index of overall interest $I_G$ of these messages only reflects their frequency of occurrence in these new data. In order to appreciate the relevance of these messages, it is then advantageous to compare them with quasi-identical messages reported on the same aircraft model but with a different software configuration, for example a prior version.

This step 84 called <<smoothing>>, may be carried out by default by the computer 10, but may also be activated or deactivated by a user during a step 86.

If smoothing is activated, the computer 10 compares the index of overall interest $I_G$ of each message of a given class with the index of overall interest $I'_G$ of so-called prior messages, of a quasi-identical class, but originating from aircraft with a prior software configuration. If $I_G>1$ and $I'_G=1$, the index of overall interest $I_G$ of the messages of the analyzed class is reduced by 1, otherwise $I_G$ remains unchanged.

The index of local interest $I_L$ of each message is then determined according to the steps 76 to 82 described earlier.

Thus, at the end of step 28, a index of local interest is associated with each failure or state message of the new sample.

Figure 7:
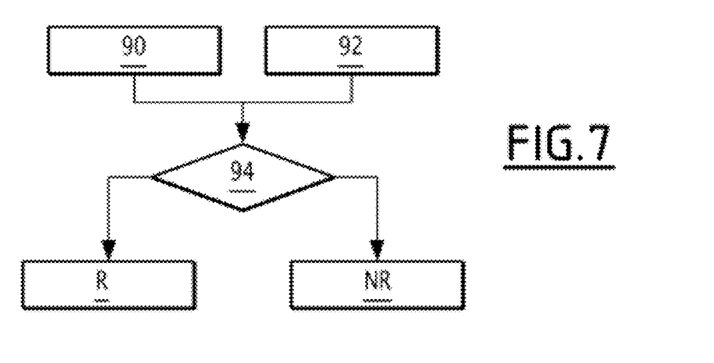
FIG. 7 is a block diagram representing a step for assigning an attribute to each reported failure, according to a particular embodiment of the invention.

A block diagram is illustrated in FIG. 7, illustrating the step 30 for assigning an attribute to each message, indicating the existence or the absence of documents relating to identical or close failures or states, for example failures or states involving the same piece of equipment of the aircraft, in one or more failure databases. This is for example a base of failure reports, enriched by the manufacturer from reports of failures and resolution of these failures transmitted by the customers, and a spare part base, listing the sold pieces of equipment or spare parts.

Thus, in a step 90, the computer carries out for each message, a semantic search in the failure report base in order to determine if this base contains at least one report associated with the same model as the aircraft 2, the title and/or description of which have semantic proximity with the wording of this message.

Moreover, during a step 92, the computer carries out for each message, a semantic search in the spare part base, in order to determine whether among the types of spares most sold in the following days, each occurrence of a message of the same class in the database (for example from the 3 types of most sold spares in the next 7 days), at least one spare part is found for which the wording is close or identical to the wording of the equipment incriminated by the message.

The results of steps 90 and 92 are analyzed in 94 by the computer. If, for a given message, at least one failure report was found during step 90, and/or if at least one spare part was found during step 92, the computer 10 assigns to this message an attribute, noted as <<R>>, indicating that the failure associated with this message is documented. If on the other hand no failure report and no spare part were found, the computer 10 assigns to this message an attribute, noted as <<NR>>, indicating that the failure associated with this message is not documented.

It should be noted that the semantic analysis of existing documentation relating to a failure or state message may also relate to any other technical database, including a base of survey reports or a base of requests for guarantee claims. The calculation of the attribute <<R>> is then refined accordingly during step 94 by taking into account the semantic analysis of these additional data.

Next, the computer juxtaposes its attribute R or NR to the index of local interest $I_L$ of each message.

Figure 8:
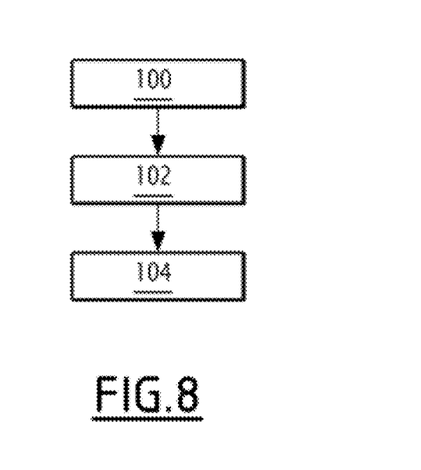
FIG. 8 is a block diagram illustrating a step for displaying results of the analysis of failure or state messages according to a particular embodiment of the invention.

Next, during the display step 32, illustrated in FIG. 8, the computer generates the display on the display device 12 of the messages of the database according to criteria defined by the user.

Thus, during a parameterization step 100, the user indicates by means of input peripherals 14 which properties of the messages should be displayed and which filters have to be applied to the messages for their display. The user for example chooses to only display the messages of the new sample having a index of local interest $I_L$ of less than or equal to 2 and an NR attribute.

The messages of the database are then filtered and those meeting the criteria defined by the user are displayed in 102 on the display device 12. The messages are for example displayed as a table, each line of which corresponds to one recording and the columns of which indicate the characteristics of this message as selected by the user during step 100.

Moreover, if a label A or B has been assigned to the configuration viewed during step 24, the computer generates in a step 104 the display of an alert indicating that the sample is not yet stable, and that the indexes of local interest have to be interpreted accordingly, i.e. with a little more discrimination than in the case of a configuration having a label C.

With the method of analysis according to the invention it is thereby possible to automatically filter the failure or state messages recorded by an apparatus, and to automatically distinguish the messages corresponding to isolated cases, requiring specific analysis, the messages reflecting a more common problem, which may generally be solved by non-specialized operators and requiring analysis and the messages not requiring any analysis.

The method according to the invention thus allows classification of the messages by analysis priority order, and thus a significant improvement in the rapidity and efficiency of the analysis of failure or state messages.

In particular, the detection of the messages does not require any analysis or corrective action, even before a human inspection is carried out, allows a reduction in the maintenance costs, while by automatically putting forward messages requiring analysis gives the possibility of reducing the technical expertise level required for reading the files generated by the central maintenance computer 4, and therefore the training costs of the operators.

Moreover, systematic integration of the messages recorded by the maintenance computers to a central database allows reconstruction of a complete and homogeneous experience of the failures reported on various craft, and the creation with a minimum cost of a reliable database, representative of each craft configuration and able to be exploited within the scope of searching for failure from a feedback experience study.

However, it should be understood that the exemplary embodiments shown above are not limiting.

Notably, according to another embodiment, the data recorded during the flight of the aircraft, for example by equipment of the <<black box>> type, recording state and control parameters, are taken into account for determining the overall $I_G$ and local $I_L$ indexes of interest and automatically solving the failures.

According to still another embodiment, the aircraft is not provided with the communications system 8, the failure or state data then being uploaded from the computer when the airplane is on the ground.

It will also be noted that the determination of a index of local interest enables refinement in the selection of the failure or state messages but the invention may perfectly be applied without this step, the determination of the index of overall interest being sufficient by itself for discriminating the recorded messages with acceptable efficiency.

Moreover, the method and the system according to the invention may be applied for analyzing for failure or state messages originating from any types of craft, such as aircraft, as described earlier, but also from other types of vehicles.

What is claimed is:

1. A method for automatic analysis of failure or state messages generated by at least one complex system, comprising:
   integrating said messages to a database of failure or state messages,
   determining with a computer, for each of said messages, an index of overall interest characterizing a degree of relevance of said message, on the basis of at least one parameter representative of a frequency of occurrence of similar messages in said database, and of a correlation between said or each representative parameter and a predefined number of indexes of overall interest.

2. The analysis method according to claim 1, further comprising determining, for each of said messages, an index of local interest, characterizing a level of interest of said message, depending on said index of overall interest and on a local context of occurrence of this message.

3. The analysis method according to claim 2, further comprising displaying at least one portion of said messages and of the determined indexes of local interest for these messages.

4. The analysis method according to claim 2, further comprising determining said local context of occurrence of each failure or state message, said determining comprising the determination of the duration of occurrence of this message and the identification of other messages generated by said complex system and related to the same malfunction as said message.

5. The analysis method according to claim 1, further comprising associating with each failure or state message, an attribute, indicating the existence or absence in at least one database of technical reports, of information relating to said message.

6. The analysis method according to claim 1, wherein determining the index of overall interest of a message comprises a step for determining a frequency of occurrence of similar messages in said database, with respect to the total number of messages generated within a same overall context.

7. The analysis method according to claim 6, wherein determining the index of overall interest comprises assigning to each class of messages, from computed frequency ratio values, an index of frequency interest characterizing the value of the frequency ratio of this class of messages with respect to the frequency ratio values of other classes of messages of the sample having occurred within the same overall context, the index of frequency interest being advantageously assigned for the classes of messages with a given overall context, by cutting out the interval [0;1] of the possible values of the frequency ratio into N successive intervals forming a partition of the interval [0;1].

8. The analysis method according to claim 1, wherein determining the index of overall interest of a message comprises determining a proportion of complex systems for which similar messages have been generated, with respect to the total number of complex systems for which failure or state messages have been generated within a same overall context.

9. The analysis method according to claim 8, wherein the determination comprises assigning to each class of messages, from values of determined cover ratios, a cover interest index characterizing the value of the cover ratio of this class of messages with respect to the cover ratios of the other classes of messages of the sample having occurred within the same overall context, the cover interest index being advantageously assigned by cutting out the interval [0;1] of the possible values of the cover ration into N successive intervals forming a partition of the interval [0;1].

10. The analysis method according to claim 1, wherein said correlation between said or each representative parameter and a predefined number of overall indexes is achieved by means of an assignment table indicating the value of the overall index of interest of said message at a function of the value of the representative parameter(s).

11. The analysis method according to claim 1, further comprising assigning to a configuration of said complex system a label characterizing a stability level of said database during the integration of said failure or state messages to said database.

12. The analysis method according to claim 11, wherein assigning a label comprises determination of a convergence index, characterizing to which extent the integration of said messages to said database modifies the distribution of the types of messages and of complex systems in said database.

13. The analysis method according to claim 12, wherein the determination for each of said messages, of an index of overall interest is further achieved on the basis of the label assigned to the configuration of said complex system.

14. The analysis method according to claim 1, wherein the index of overall interest of each failure or state message is determined from at least three values.

15. The analysis method according to claim 1, wherein said complex system is an aircraft.

16. A system for automatic analysis of failure or state messages generated by at least one complex system, comprising a computer configured to:
    integrate said messages to a database of failure or state messages, and
    determine, for each of said messages an index of overall interest characterizing a degree of relevance of said message, on the basis of at least one parameter representative of a frequency of occurrence of similar messages in said database, and of a correlation between said or each representative parameter and a predefined number of indexes of overall interest.

17. The analysis system according to claim 16, wherein the computer is configured to determine, for each of said messages an index of local interest, reflecting a level of interest of said messages, depending on said index of overall interest and on a local context of occurrence of these messages.

\* \* \* \* \*